Figure 1:
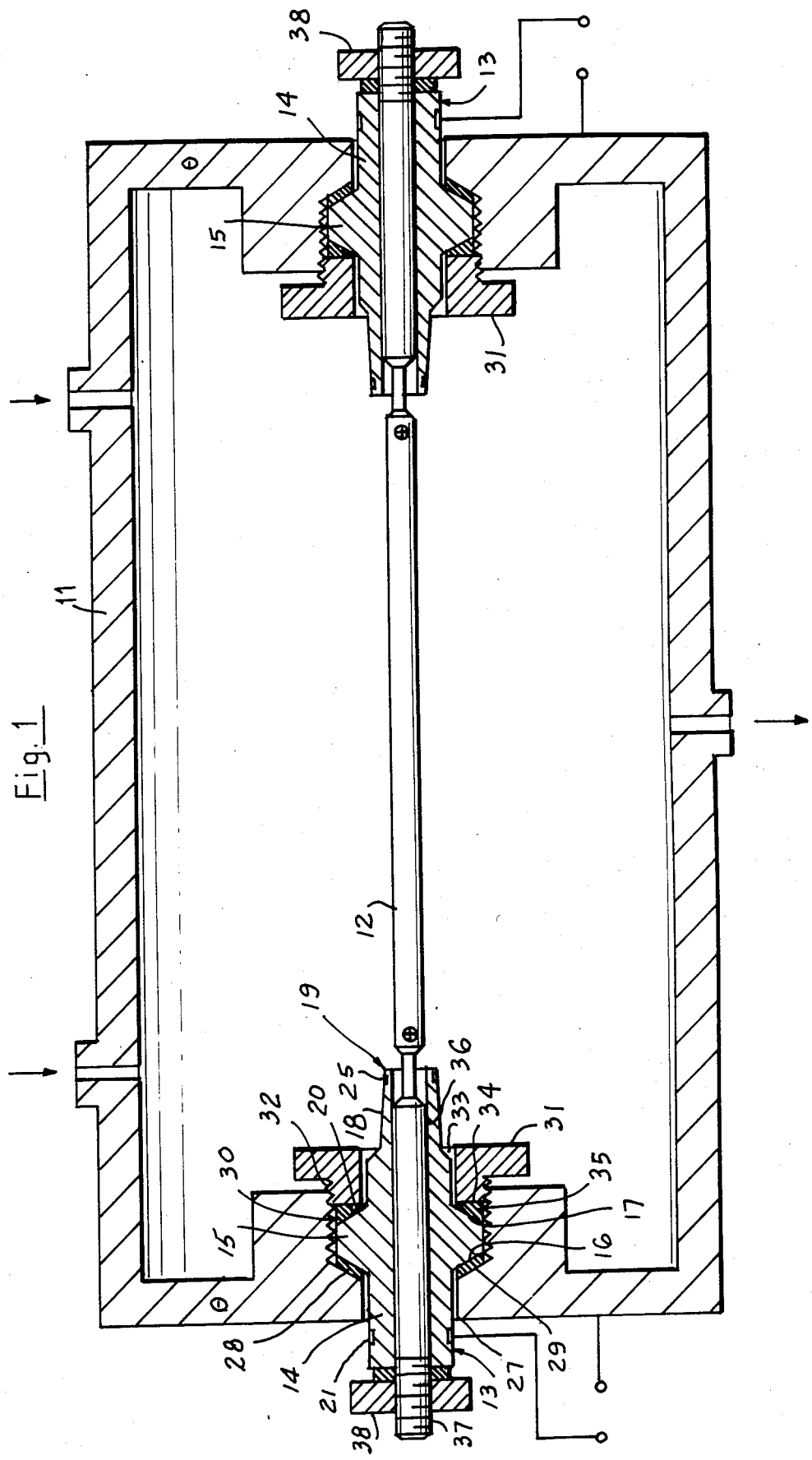

United States Patent [19]

Esper et al.

[11] Patent Number: 4,618,351
[45] Date of Patent: Oct. 21, 1986

[54] DEVICE FOR CLEANING OF GASES

[75] Inventors: Friedrich Esper, Leonberg; Thomas Frey, Friolzheim, both of Fed. Rep. of Germany

[73] Assignee: Robert Bosch GmbH, Stuttgart, Fed. Rep. of Germany

[21] Appl. No.: 642,671
[22] PCT Filed: Jan. 27, 1984
[86] PCT No.: PCT/DE84/00022
 § 371 Date: Aug. 10, 1984
 § 102(e) Date: Aug. 10, 1984
[87] PCT Pub. No.: WO84/03332
 PCT Pub. Date: Aug. 30, 1984

[30] Foreign Application Priority Data

Feb. 18, 1983 [DE] Fed. Rep. of Germany ....... 3305601

[51] Int. Cl.$^4$ .............................................. B03C 3/06
[52] U.S. Cl. ........................................ 55/146; 60/311;
 174/152 R; 174/139; 55/DIG. 30
[58] Field of Search ................ 55/140, 146, DIG. 30;
 23/313; 60/311, 275; 174/152 R, 139; 219/209

[56] References Cited

U.S. PATENT DOCUMENTS

| | | | |
|---|---|---|---|
| 1,099,365 | 6/1914 | Henderson | 219/209 |
| 1,690,135 | 11/1928 | Seekamp | 219/209 |
| 3,740,925 | 6/1973 | Gothard | 55/DIG. 30 |
| 4,116,790 | 9/1978 | Prestidge . | |

FOREIGN PATENT DOCUMENTS 497081  5/1930  Fed. Rep. of Germany .
923167  2/1947  France .

OTHER PUBLICATIONS

Patent Abstract of Japan 56-97561 6-8-81 Toyota Jidosa Kogyo K.K.

Primary Examiner—Bernard Nozick
Attorney, Agent, or Firm—Michael J. Striker

[57] ABSTRACT

A device for cleaning of gases of electrically conductive particles, like soot and the like, in particular for cleaning of exhaust gases of fossil fuels, like exhaust gases of Diesel motors and the like, with a coagulator admitted by the gases is suggested, whereby for preventing the formation of a short circuit bridge between electrode and housing of coagulator caused by deposition of agglomerates the insulator which provides for an insulated conduct of electrode through housing is provided with a ring segment at the location where the electrode exits into the inside of the housing extending in axial direction from the insulator, whereby at least one preferable ring like annealing zone is provided thereon. Due to the prevailing temperature of about 450° C. at annealing zone all depositing agglomerates are burned off.

13 Claims, 2 Drawing Figures

DEVICE FOR CLEANING OF GASES

STATE OF THE ART

The invention relates to a device for cleaning of gases of electrically conductive particles, like soot and the like, in particular for cleaning exhaust gases of fossil fuels, like exhaust gases of Diesel motors.

In a known device of this type the articles contained in the gas, for example, soot particles in the exhaust gas of internal combustion engines are coagulated for an easier separation in filters, turbulence chambers, centrifuges and the like, which is performed by electrostatic charging of the particles or by embossing an influence charge on the particles. A high electric voltage is applied between the housing and the concentrically disposed metallic electrode of the coagulator for generating an electrical field in both cases. Electrically charged particles deposit into larger agglomerations which can be easily separated in the separator devices due to their size and their weight. A part of the agglomerates already deposits in the coagulator. After a while layers are formed by the conductive agglomerates on the insulator which assures the conduct of the electrode through the housing thus resulting in shorts and therefore the breakdown of the device. Consequently, frequent operating interruptions and maintenance operations do occur.

ADVANTAGES OF THE INVENTION

The device in accordance with the invention is advantageous in that agglomeration deposits, for example, soot layers forming on the insulator either burn off or are not even generated due to the annealing zone. Soot sublimes at a temperature higher than 400° C., for example. The gas like sublimate is discharged together with the gas flow from the coagulator. Thus, the coagulator and thereby the total device are free from breakdowns and operable. The additional effort for the annealing zones in accordance with the invention is very low due to the simple mode of construction. Also, the required heating consumption is relatively low and is about 20 Watt per insulator in a realized device.

Thereby, the annealing zones in accordance with the invention can be realized in a simple, cost effective manner. Metals from the Wolfram and platinum group, nickel, gold and silver are particularly suitable as a material for thick layer heat conductivity paths, palladium as a metal for the insulator and ceramics are used for the cover layer of the annealing zone and the connecting lines (for example, $Al_2O_3$), glass ceramics or glass, for example, $SiO_2$ glass.

DRAWING

Figure 2:
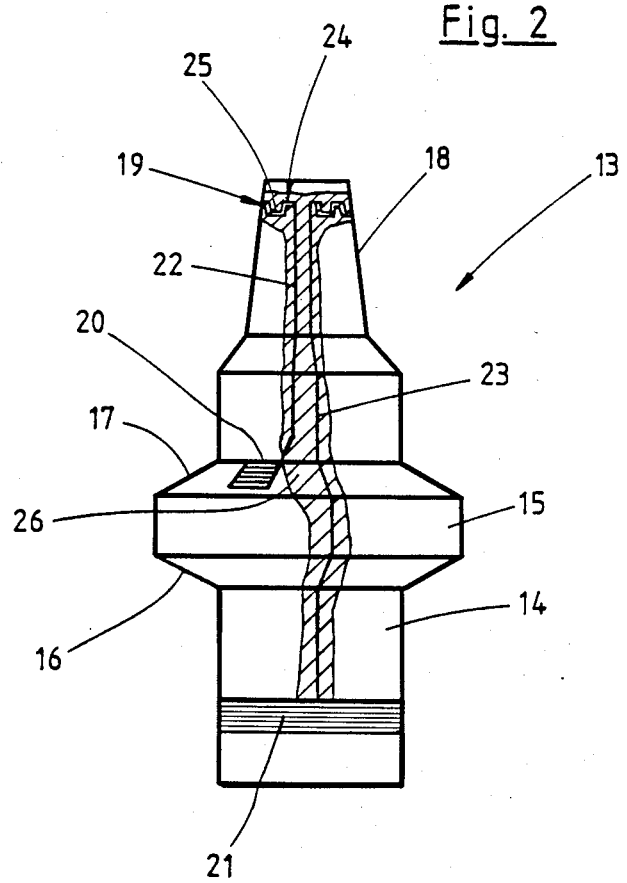

The invention is described in more detail in the following in conjunction with an exemplified embodiment illustrated in the drawing. The drawing shows:

FIG. 1 a longitudinal sectional view of a coagulator of a device for cleaning of exhaust gases of a Diesel motor FIG. 2 a sideview of an insulator of the coagulator in FIG. 1.

DESCRIPTION OF THE EXEMPLIFIED EMBODIMENT

The device for cleaning the exhaust gas of a Diesel motor of electrically conductive particles like, for example, soot particles, is provided with a coagulator 10 which is illustrated in a longitudinal sectional view and which is admitted by the exhaust gases of the Diesel motor and wherein an influence charge is embossed on the soot particles. Due to these influence charges the soot particles coagulate into larger agglomerates which can be easily filtered out due to their size and their weight in separators (not shown), like filter, turbulence chamber, centrifuge and the like. Such coagulators are disclosed, for example, in DE-OS No. 2,408,511 or U.S. Pat. No. 3,110,580.

The coagulator 10 illustrated in a sectional longitudinal section in FIG. 1 is provided with a cylindrical housing 11 and an electrode 12 which is concentrically disposed in housing 11. Electrode 12 is connected to the positive pole of a grounded high voltage source (not shown), while the housing 11 is grounded thus forming the counter electrode. Electrode 12 is maintained and guided in housing 11 by means of two insulators 13 in an insulated manner. FIG. 1 shows only the left side of the coagulator 10 and therefore only one insulator 13. The right part of the coagulator 10 is identical with the part illustrated in FIG. 1, however it is constructed mirror symmetrically, so that the electrode 12 is maintained on both ends in the same manner in one of the insulators 13, as shown in FIG. 1 for the left part.

The insulator (13) (FIG. 2) is provided with a hollow cylindrical section 14 carrying a circular like flange 15 with oblique mounted ring like shoulders 16 and 17. The hollow cylindrical section 14 is graduated on the one end and carries a hollow cylindrical ring segment 18 which conically tapers toward the free end. The ring segment 18 carries a ring like annealing zone (19) which is electrically heatable through connecting contacts 20 and 21 and connecting lines 22 and 23. In order to prevent sparkovers from the electrode 12 to the annealing zone 19, a large distance is set between them, for example, in that electrode 12 is provided with a reduced diameter in the area of the insulator end and/or the annealing zone 19 is disposed at a certain distance from the insulator end. The annealing zone 19 is formed by an electrical resistor wire 24 which preferably extends as a thick layer heat path 25 spirally over the circumference of the ring segment 18. One end of the thick layer heat path 25 is connected with the connecting contact 20 by means of a connecting line 22, whereby the connecting contact is mounted outside on the hollow cylindrical section 14 or shoulder 17. The other end of the thick layer heat path 25 is connected through the connecting line 23 with the connecting contact 21 which is mounted on the free end of the hollow cylindrical section 14 as a ring contact for a clamping contact or as a simple solder contact. The thick layer path 25 as well as the connecting line 22 and 23 are mounted on the surface of the insulator 13 and coated with an insulating cover layer 26, which is shown schematically by shaded lines in FIG. 2. The cover layer 26 as well as the insulator 13 consist of insulating materials which are resistant up to at least 600° C., like ceramic (for example, $Al_2O_3$), glass ceramic or glass (for example, $SiO_2$-glass). The resistor wire 24 or the thick layer heat path 25 is made from a metal of the Wolfram or platinum group, nickel, silver, gold or palladium.

The insulator 13 is introduced through housing 11 with the free end of the hollow cylindrical section 14 from the inside of the housing 11 through a graduated bore 27 in such a manner that shoulder 16 of flange 15 engages on a correspondingly designed shoulder 28 in bore 27 with an intermediate annular seal 29. The bore segment of bore 27 with the larger diameter is provided with an inner thread 30 wherein a set screw 31 can be screwed with an outer thread 32 from inside housing 11. The set screw 31 overlap with a passage bore 33 the part of the hollow cylindrical 14 adjacent shoulder 17 of insulator 13 and arrests insulator 13 in the graduated bore 27 with its front face 34 which engages shoulder 17 of flange 15 by means of an annular seal 35 with trapezoidal like diameter. By screwing the set screw 31 in bore 27 of housing 11 it comes into mechanical contact with the connecting contact 20 which is mounted on shoulder 17 thus representing an electrical connection of the thick layer heat path 25 with housing 11 which is connected to mass. However, the connecting contact 21 is disposed outside of housing 11 and can be connected to the positive pole of a heat voltage source.

Electrode 12 is fed through insulator 13 by a passage bore 36. Electrode 12 carries on each end one outer thread section 37 on which a set screw 38 can be screwed on. In the mirror symmetric arrangement of the insulator 13 at each end of electrode 12 the electrode 12 is held in position at both ends of insulator 13 by the two set screws 38 and braced.

The housing 11 is also provided with two openings for the input and output of the discharge gas, not shown. The discharge gas flows through the inside of housing 11, whereby in a known manner an influence charge is embossed onto the soot particles or soot droplets due to the ho,ogenic generated electric field between the electrode 12 and the housing 11 which operates as the counter electrode. The charged soot particles coagulate into larger agglomerates. A small percentage of this agglomerate deposits already in the coagulator, that is, also on electrode 12 and the conical ring segment 18 of the insulator 13. The depositing of agglomerates is prevented in the area of the annealing zone due to the prevailing surface temperature, since soot sublimes in the temperature prevailing in the annealing zone. Therefore, there is always an insulating ring zone present in the area of annealing zone 19 even with a strong soot separation in coagulator 10, so that the soot deposition cannot form a bridge between the electrode 12 and the grounded housing 11. If soot has deposited on the annealing zone 19, after switching off the heater, such a deposition is burned off after switching on the heat.

We claim:

1. A coagulator device for cleaning in an electrical field of gases of electrically conductive particles, such as soot and the like, particularly for cleaning exhaust gases of fossil fuels, such as exhaust gases of diesel engines and the like, the device comprising a poled housing which forms a counter electrode, said housing having an axis and being provided with a gas inlet and outlet; an electrode longitudinally extending in said housing concentrically with the latter; an insulator mounted in said housing and encompassing said electrode over a portion of its longitudinal extension so as to insulate said electrode from said housing, said electrode having an outlet location inside said housing, said insulator being provided in the region of said outlet location with a conically tapering ring section extending in an axial direction; means on said insulator forming an annealing zone, said annealing zone forming means including at least one electrical resistance wire which is formed as a thick layer heat path extending around the circumference of said conically tapering ring section of said insulator and having two ends; and electrical connecting contacts provided on said insulator and connected through insulated connecting lines with said ends of said thick layer heat path.

2. A device as defined in claim 1, wherein said conically tapering ring section extends in the axial direction.

3. A device as defined in claim 1, wherein said electrical resistance wire is shaped so that said annealing zone is ring-like.

4. A device as defined in claim 1, wherein said thick layer heat path extends spirally around the circumference of said ring section of said insulator.

5. A device as defined in claim 1; and further comprising an insulating cover layer which coats said electrical resistance wire.

6. A device as defined in claim 1, wherein said annealing zone is spaced from said electrode by a relatively large distance.

7. A device as defined in claim 1, wherein said electrode has a portion which is close to said annealing zone and has a diameter which is reduced relative to the remaining portion of said electrode.

8. A device as defined in claim 1, wherein said insulator has an end, said annealing zone being adjacent from said end of said insulator.

9. A device as defined in claim 1, wherein said insulator has a section which is adjacent to said housing and has a non-insulating contact face, said contacts including one connecting contact which is mounted outside of said housing, and the other connecting contact which is formed on said non-insulating contact face of said adjacent section of said insulator.

10. A device as defined in claim 9, wherein said one connecting contact is formed as a ring contact on the circumference of said insulator.

11. A device as defined in claim 9, wherein said other connecting contact is located within said housing.

12. A device as defined in claim 11, wherein said housing has a stepped opening with a first annular shoulder, said insulator having two radially extending annular shoulders, one of said annular shoulders of said insulator engaging on said first annular shoulder of said stepped opening of said housing; and further comprising a hollow set screw supported on the other annular shoulder of said insulator, said hollow set screw having an outer thread and being screwable into said stepped opening of said housing so that in a screwed state it has a mechanical contact with said non-insulating contact face.

13. A device as defined in claim 12, wherein said stepped bore of said housing has another shoulder; and further comprising sealing means provided between said first annular shoulder of said housing and said one annular shoulder of said insulator, and also between said second annular shoulder of said housing and said set screw.

* * * * *